(12) United States Patent
Barborič et al.

(10) Patent No.: US 6,777,468 B2
(45) Date of Patent: Aug. 17, 2004

(54) SOFT SEALING MATERIAL

(75) Inventors: Franci Barborič, Medvode (SI); Boris Vidjak, Kranj (SI); Franc Černec, Grosuplje (SI)

(73) Assignee: Donit Tesnit druzba za proizvodnjo tesnilnih materialov, d.d., Medvode, Medvode (SI)

( * ) Notice: Subject to any disclaimer, the term of this patent is extended or adjusted under 35 U.S.C. 154(b) by 0 days.

(21) Appl. No.: 10/276,879

(22) PCT Filed: May 16, 2001

(86) PCT No.: PCT/SI01/00016

§ 371 (c)(1),
(2), (4) Date: May 23, 2003

(87) PCT Pub. No.: WO01/88055

PCT Pub. Date: Nov. 22, 2001

(65) Prior Publication Data

US 2003/0181545 A1 Sep. 25, 2003

(30) Foreign Application Priority Data

May 19, 2000 (SI) .......................................... P-20000125

(51) Int. Cl.⁷ ............................. C08K 3/34; C08K 3/04; C08K 7/00; C09K 3/10
(52) U.S. Cl. ...................... 524/130; 524/202; 524/203

(56) References Cited

U.S. PATENT DOCUMENTS

| | | | | |
|---|---|---|---|---|
| 4,374,211 A | * | 2/1983 | Gallagher et al. | 523/156 |
| 4,529,653 A | * | 7/1985 | Hargreaves et al. | 428/450 |
| 5,294,300 A | * | 3/1994 | Kusuyama | 162/157.3 |
| 5,437,920 A | * | 8/1995 | Bauer et al. | 442/417 |

FOREIGN PATENT DOCUMENTS

| | | | |
|---|---|---|---|
| EP | 331987 A2 | * 9/1989 | C08J/3/20 |
| EP | 915133 A1 | * 5/1999 | C08L/9/04 |

OTHER PUBLICATIONS

Derwent abstract Acc–No: 1993–028046 (for DE 4123737A1) (Jan. 21, 1993) Spiliadis, S.*

* cited by examiner

Primary Examiner—Matthew A. Thexton
(74) Attorney, Agent, or Firm—Connolly Bove Lodge & Hutz LLP

(57) ABSTRACT

There is disclosed a composition for a soft (non-metal) sealing material having the following percentage composition based on the overall composition: from 4 to 9 wt. % of fibrillated polyaramide fibers; less than 60 wt. % of powder graphite having a carbon content of 90 to 92 wt. % and such particle size distribution that at least 85% of all particles are in the size range of 10 $\mu$m to 50 $\mu$m; about 30 wt. % of mineral fillers represented by a combination of microsilica having a $SiO_2$ content between 90 and 95 wt. %, a specific surface area according to BET method of 15 to 25 $m^2/g$ and such particle size distribution that at least 90 wt. % of all particles are in the particle size range under 5 $\mu$m, and of an active mineral filler having a $SiO_2$ content of at least 98 wt. %, a specific surface area according to BET method of 100 to 120 $m^2/g$ and such particle size distribution that at least 90 wt. % of all particles are in the particle size range of 5 $\mu$m to 50 $\mu$m, the ratio of microsilica to the mineral filler being such that the value of the total specific surface area according to BET method is between 45 and 55 $m^2/g$; and, optionally, friction agents for enhancing the friction between graphite particles and, optionally, biosoluble mineral fillers; about 12 wt. % of elastomeric binders; up to 2 wt. % of a vulcanization system in paste form containing zinc dibenzyldithiocarbamate (ZBEC) or zinc 2-ethylhexyldithiophosphate (ZDT) as vulcanization accelerants; and usual auxiliary substances in usual amounts. The material is produced according to a process, which is also one of the objects of the present invention, and is used for the manufacture of gaskets for technical and industrial applications.

16 Claims, No Drawings

SOFT SEALING MATERIAL

TECHNICAL FIELD

The present invention relates to a soft (non-metal) sealing material, more particularly to compositions for a soft (non-metal) sealing material, to a process for the preparation thereof, to a novel soft (non-metal) sealing material made according to said process in planar form such as plates, continuous bands, and to the use thereof for technical and industrial applications such as gaskets for flanges, valves, pumps, heat exchangers and pressure vessels, for use in the construction of power plants, chemical plants and heating systems, where it is necessary to provide for an optimum balance between the sealability of the sealing assembly and the thermal as well as chemical resistance of the sealing material employed.

TECHNICAL PROBLEM

It was tried to develop and to produce, in an economical manner, a sealing material by an environmentally friendly paper process or paper and calender manufacturing process, which material would not contain substances detrimental to health and would show appropriate functional properties when used at higher temperatures and, besides, it would not emit substances detrimental to health above the permissible limit into the environment.

PRIOR ART

With increasing health and environment consciousness, in products on the basis of elastomers vulcanization agents have recently started to be used which do not cause the formation of cancerogenic N-nitrosamines. Thus, in DE 4038946 the use of said vulcanization agents for the manufacture of rubber sealing rings is disclosed and in EP 0915133 the use thereof for the manufacture of rubber articles for use in medicine is disclosed. In the manufacture of soft sealing materials made from a mixture of different kinds of fibers, binders and fillers, among them being also graphite (U.S. Pat. Nos. 5,437,920; 4,529,653), various additives are mentioned, yet the use of vulcanization agents that do not form dangerous N-nitrosamines above the permissible limit is not disclosed. In U.S. Pat. No. 5,437,920 a sealing material is disclosed, wherein by using 0.5 to 1.5% of non-fibrillated organic staple fibers having an elongation at break up to 200° C. under 2% in combination with 2 to 4% of fibrillated polyaramide fibers and at least 60% of powdered graphite good thermal properties (small changes in thickness at compression loading of the material at elevated temperatures) of the sealing material are achieved, whereas the material without the use of non-fibrillated fibers shows greater changes in thickness under the same conditions. In this patent specification no special ecological advantages are mentioned except that no asbestos is contained therein and that it is produced by paper process or paper and calender process without the use of organic solvents.

TECHNICAL SOLUTION

The first object of the invention is a composition for a soft sealing material, characterized in that it has the following percentage composition based on the overall composition:

from 4 to 9 wt. % of fibrillated polyaramide fibers,
less than 60 wt. % of powder graphite having a carbon content of 90 to 92 wt. % and such particle size distribution that at least 85% of all particles are in the size range of 10 μm to 50 μm,
about 30 wt. % of mineral fillers represented by a combination of microsilica having a $SiO_2$ content between 90 and 95 wt. %, a specific surface area according to BET method of 15 to 25 $m^2/g$ and such particle size distribution that at least 90 wt. % of all particles are in the particle size range under 5 μm, and of an active mineral filler having a $SiO_2$ content of at least 98 wt. %, a specific surface area according to BET method of 100 to 120 $m^2/g$ and such particle size distribution that at least 90 wt. % of all particles are in the particle size range of 5 μm to 50 μm, the ratio of microsilica to the mineral filler being such that the value of the total specific surface area according to BET method is between 45 and 55 $m^2/g$; and, optionally, friction agents for enhancing the friction between graphite particles and, optionally, biosoluble mineral fillers,
about 12 wt. % of elastomeric binders,
up to 2 wt. % of a vulcanization system in paste form containing zinc dibenzyldithiocarbamate (ZBEC) or zinc 2-ethylhexyldithiophosphate (ZDT) as vulcanization accelerants and
usual auxiliary substances in usual amounts.

As fibrillated polyaramide fibers there are used poly-p-phenyleneterephthalamide fibrillated fibers in pulp form having a specific surface area according to BET method of 12 to 15 $m^2/g$ and an average length 1.1 to 1.7 mm, e.g. as commercially available under the trade mark Twaron® of Twaron Products bv.

The chosen combination of a semi-active filler (microsilica) and an active mineral filler such as defined above has a reinforcing effect on the elastomer. Microsilica is a by-product in the production of ferrosilicon. As the active mineral filler especially precipitated amorphous silica is used.

Already microsilica may act as a friction agent, however, additional agents may be used such as corundum having an $Al_2O_3$ content above 95 wt. % or silicon carbide having a SiC content above 97.5 wt. %, and with such a particle size distribution that at least 95 wt. % of particles are smaller than 6 μm.

As biosoluble mineral fibers rock wool fibers may be used, which are excluded from classification as a cancerogen according to the Note Q of the Directive of EU Commision 97/69E, for which fibers the short-term test of biopersistence by inhalation shows that fibers longer than 20 μm have a weighted half-life of less than 10 days.

The combination of microsilica and precipitated amorphous silica, when used as the active mineral filler, in an aqueous suspension shows such a zeta potential value that an optimum retention of the filler in suspension with polyaramide fibers is achieved. The balanced ratio between the particle size distribution and the specific surface area of the filler makes it possible to achieve an optimum ratio between the packing density of particles together with fibers and the strength of bonds between the elastomeric binder and the filler, which results in good thermal stability and a simultaneous good sealability of the sealing material. As fillers also friction agents for enhancing the friction between graphite particles may be used, whereby there is achieved an improvement of $\sigma_{VO}$—the greatest allowed surface pressure when built-in—and $\sigma_{BO}$—the greatest allowed surface pressure during working according to DIN 28090-1, Statische Dichtungen für Flanschverbindungen—Teil 1: Dichtungskennwerte und Prüfverfahren.

As elastomeric binders there are used especially latices, natural and synthetic rubbers such as chloroprene, neoprene, polyisoprene, polyisobutylene, butyl rubber, nitrile butadiene rubber (NBR), hydrogenated nitrile butadiene rubber HNBR), styrene butadiene rubber (SBR), ethylene propylene rubber (EPR), ethylene propylene diene rubber (EPDR), acrylate rubber (ACM), epichlorohydrine rubber (ECO), sulfonated polyethylene rubber (CSM), carboxylated nitrile butadiene rubber (XNBR), carboxylated hydrogenated nitrile butadiene rubber (XHNBR) and combinations thereof. NBR, XNBR, HNBR and XHNBR are especially preferable.

Zinc dibenzyldithiocarbamate (ZBEC) and zinc 2-ethylhexyldithiophosphate (ZDT) are vulcanization accelerators which do not form N-nitrosamines detrimental to health above the permissible limit. They were chosen by means of a selection of cross-linking agents which according to literature data do not form N-nitrosamines detrimental to health above the permissible limit and provide for an adequate rate and density of cross-linking. The selection was based upon the results of an analysis of volatile products emitted from sealing materials at elevated temperatures, by different methods of instrumental chemical analysis. By the use of said agents sealing materials according to the invention are obtained, which do not contain N-nitrosamines detrimental to health above the permissible limit and, when used at elevated temperatures, do not emit other degradation products detrimental to health above permissible concentrations.

The vulcanization system with the vulcanization agent colloidal sulfur, a vulcanization accelerator (ZBEC or ZDT) and an activator (ZnO) as well as a surface active agent (sodium salt of condensed naphthalene sulfonic acid) is prepared in the form of a paste, which makes possible an optimum mixing into the elastomeric binder. If necessary, an antireversion additive e.g. m-phenylene dimaleimide may be used for improving the settling at loadings at elevated temperatures.

Usual additives are a matter of common knowledge and/or are evident from further disclosure of the present invention and an artisan will add them as the purpose may be. They are e.g. precipitation agents, retention agents, antidegradants, antireversion additives etc. Suitable precipitation agents are e.g. aluminum sulfate, polyacrylamide, cation active starch.

Another object of the invention is a process for the preparation of a substance for applying onto a paper machine in the manufacture of the soft sealing material. This process is based on a prior preparation of the components cited above as the composition of the sealing material and on an exactly defined sequence of adding these components. In this process a two-step fixing—coagulation of the elastomeric binder is carried out: the first phase comprises a partial fixing of the elastomer by vulcanization agents onto the mineral fillers and polyaramide fibers and the second phase comprises a final fixing together with powder graphite.

The process according to the invention comprises the following phases in the stated sequence:

a) defibration of polyaramide fibers in a defibrator to obtain an aqueous suspension with 3.5 to 4.5 wt. % of fibers, 50–60° SR, having a zeta potential of −10 to −15 mV;

b) a hydromechanical treatment of an aqueous suspension of mineral fillers having a concentration of 45 to 55 wt. % mineral fillers with the addition of 0.1 to 0.15 wt. % $Na_2CO_3$ for improving dispersibility up to zeta potential of −30 to −35 mV;

c) feeding a suspension of polyaramide fibers and hydromechanically treated fillers into a mixing vessel, stirring and diluting;

d) blending one part of a vulcanization paste into one part of elastomeric binder for the first fixing, the amount of the elastomeric binder used and the proportional amount of the vulcanization paste being such that a ratio $R_1$ between the volume of the elastomeric binder and the total specific surface area of fibers and fillers amounts to from 4.5 to 5 nm;

e) feeding d) into a mixing vessel;

f) the first fixing of the elastomeric binder with the vulcanization paste onto polyaramide fibers and mineral fillers by a precipitation agent until the sign of the zeta potential is changed;

g) feeding and blending powder graphite and diluting;

h) blending the second part of the vulcanization paste into the elastomeric binder for the second fixing, the amount of the elastomeric binder used and the proportional amount of vulcanization paste being such that a ratio $R_2$ between the volume of the elastomeric binder and the total specific surface area of all components amounts to from 7.5 to 8 $\mu$m;

i) feeding h) into a mixing vessel;

j) the second fixing of the elastomeric binder with the vulcanization paste onto the total amount of components by a precipitation agent until the sign of zeta potential is changed.

The process for the preparation of the substance is followed by a usual additional treatment to the final sealing material in planar form. The substance in a concentration of 2 to 5 wt. % in water is conveyed to a sieve and the layer formed is further dewatered by evacuation and pressing, it is dried and cross-linked in a drying chamber at 110 to 140° C. To improve the sealability of the sealing material, after the completed drying phase (humidity content of 1% at most) the material may be additionally pressed on a calender or in a planar press during heating at an elevated temperature.

Due to an optimum combination in the composition of the components and as prepared according to the present process, the sealing material according to the invention has the following advantages:

a combination of microsilica and another mineral filler such as e.g. precipitated amorphous silica and of a reduced graphite content (under 60 wt. %) as well as a two-step fixing of the elastomeric binder result in an optimum balance between the thermal stability of the sealing material and its sealability; in such a manner a suitable thermal stability of the material is achieved also without the use of non-fibrillated staple fibers, whereas by the two-step fixing process an easier regulation of the functional properties of the sealing material is made possible;

the modification of the composition of the mineral fillers by a friction agent for enhancing the friction between graphite particles, corundum or silicon carbide results in a reduction in the creep of the material at higher loading and in and improved strength of the material;

zinc dibenzyldithiocarbamate (ZBEC) and zinc 2-ethylhexyldithiophosphate (ZDT) as vulcanization accelerators make possible suitable conditions of cross-linking as well as the inventive manufacture of such sealing materials which do not contain N-nitrosamines detrimental to health above the permissible limit and, when used at higher temperatures, do not emit other degradation products detrimental to health above permissible concentrations.

The invention is illustrated in more detail by the following Examples.

The composition of the preferred embodiments of soft sealing material according to the invention is given in Table 1 from B to F. The composition A is a comparative one. The materials were manufactured on a paper machine. Wt. % relate to the whole composition.

TABLE 1

| Example/wt. % | A | B | C | D | E | F |
|---|---|---|---|---|---|---|
| polyaramide fibers | 8.4 | 5.0 | 8.4 | 8.4 | 8.4 | 8.4 |
| powder graphite | 51.8 | 53.8 | 51.8 | 51.8 | 51.8 | 51.8 |
| microsilica | / | 17.8 | 17.1 | 17.1 | 12.1 | 17.1 |
| precip. amorphous silica | 11.1 | 9.4 | 9.1 | 9.1 | 9.1 | 9.1 |
| calcined kaolin | 15.1 | / | / | / | / | / |
| corundum/silicon carbide | / | / | / | / | 5.0 | / |
| elastomer NBR | 12.6 | 13.0 | 12.6 | 12.6 | 12.6 | / |
| elastomer HNBR | / | / | / | / | / | 12.6 |
| vulc. paste A | / | 1.0 | 1.0 | / | 1.0 | 1.0 |
| vulc. paste B | 1.0 | / | / | / | / | / |
| vulc. paste C | / | / | / | 1.0 | / | / |
| total wt. % | 100 | 100 | 100 | 100 | 100 | 100 |

Compositions of vulcanization pastes are given in Table 2. Vulcanization pastes B and C contain accelerators that do not form N-nitrosarnines detrimental to health above the permissible limits.

TABLE 2

| Example/wt. % | A | B | C |
|---|---|---|---|
| colloidal sulfur | 6.4 | 9.9 | 9.9 |
| ZBEC | 17.7 | / | / |
| ZDT | / | / | 11.2 |
| zinc diethyldithiocarbamate (ZDEC) | / | 1.3 | / |
| zinc mercaptobenzothiazole (ZMBT) | / | 9.9 | / |
| ZnO | 15.9 | 19.7 | 19.7 |
| sodium salt of condensed naphthalene sulfonic acid | 3.0 | 3.0 | / |
| water | 57 | 56.2 | 56.2 |
| total wt. % | 100 | 100 | 100 |

The following process steps were carried out using the above cited components in given amounts:
a) defibration of polyaramide fibers (Twaron® of Twaron Products bv) in a defibrator to obtain an aqueous suspension with 4 wt. % of fibers, 58° SR, having a zeta potential of −15 mV;
b) a hydromechanical treatment of an aqueous suspension of microsilica and precipitated amorphous silica with a dissolver stirrer, 300 rpm, stirring time 45 minutes, the mass ratio water/mineral fillers being 1/1, with the addition of 0.1 wt. % $Na_2CO_3$ to zeta potential −30 mV;
c) feeding a suspension of polyaramide fibers and hydromechanically treated fillers into a mixing vessel, e.g. stock cest with stirrer, stirring and diluting;
d) blending one part of a vulcanization paste into one part of an elastomeric binder for the first fixing, the amount of the elastomeric binder used and the proportional amount of the vulcanization paste being such that a ratio $R_1$ between the volume of the elastomeric binder and the total specific surface area of fibers and fillers amounts to 4.8 nm;
e) feeding d) into a mixing vessel;
f) the first fixing of the elastomeric binder with the vulcanization paste onto the polyaramide fibers and mineral fillers by aluminum sulfate until the sign of the zeta potential is changed;
g) feeding and blending powder graphite and diluting;
h) blending the second part of the vulcanization paste into the elastomeric binder for the second fixing, the amount of the elastomeric binder used and the proportional amount of the vulcanization paste being such that a ratio $R_2$ between the volume of the elastomeric binder and the total specific surface area of all components amounts to 7.7 mm;
i) feeding h) into a mixing vessel;
j) the second fixing of the elastomeric binder with the vulcanization paste onto the total amount of components by aluminum sulfate until the sign of zeta potential is changed.

The process for the preparation of the substance was followed by the usual additional treatment to obtain the final sealing material in planar form. The substance in the concentration of 4 wt. % in water was conveyed to the sieve and the layer formed was further dewatered by evacuation and pressing, dried and cross-linked in a drying chamber at 120° C.

The sealing materials according to the invention have properties stated below in Table 3. Under A the properties of a reference sealing material are given and under A1 the properties of a sealing material manufactured on the basis of composition C, yet by a process of a one-step fixing of the elastomeric binder with the vulcanization paste onto the whole amount of the components.

TABLE 3

| Property | A | A1 | B | C | D | E |
|---|---|---|---|---|---|---|
| tensile strength (N/mm$^2$) | 4.6 | 6.5 | 5.5 | 7.0 | 5.2 | 8.8 |
| gas permeability (mg/sm) | 1.50 | 0.75 | 0.40 | 0.50 | 0.50 | 0.45 |
| change in thickness after loading at 50 N/mm$^2$ (%) and heating from 20 to 300° C. (%) | 11.4 | 18.3 | 13.4 | 11.5 | 8.2 | 12.0 |
| vulcanization time $t_{90}$ at 120° C. (min) | 6.6 | 12.1 | 11.4 | 11.8 | 6.1 | 11.7 |
| content of N-nitrosamines detrimental to health (μg/kg) | 12 | 2 | 2 | 2 | 1 | 2 |
| content of volatile substances at 300° C. (%) | 2.5 | 1.7 | 1.9 | 1.9 | 1.1 | 1.8 |

What is claimed is:
1. A composition for a soft sealing material characterized in that it has the following percentage composition based on the overall composition:
from 4 to 9 wt. % of fibrillated polyaramide fibers,
less than 60 wt. % of powder graphite having a carbon content of 90 to 92 wt. % and such particle size distribution that at least 85% of all particles are in the size range of 10 μm to 50 μm,
about 30 wt. % of mineral fillers represented by a combination of microsilica having a $SiO_2$ content between 90 and 95 wt. %, a specific surface area according to BET method of 15 to 25 m$^2$/g and such particle size distribution that at least 90 wt. % of all particles are in the particle size range under 5 μm, and of an active mineral filler having a $SiO_2$ content of at least 98 wt. %, a specific surface area according to BET method of 100 to 120 m$^2$/g and such particle size distribution that at least 90 wt. % of all particles are in the particle size range of 5 μm to 50 μm, the ratio of microsilica to the mineral filler being such that the value of the total specific surface area according to BET method is between 45 and 55 m²/g; and, optionally, friction agents for enhancing the friction between graphite particles and, optionally, biosoluble mineral fillers, about 12 wt. % of elastomeric binders, up to 2 wt. % of a vulcanization system in paste from containing zinc dibenzyldithiocarbamate (ZBEC) or zinc 2-ethylhexyldithiophosphate (ZDT) as vulcanization accelerants, and optionally usual auxiliary substances.

2. Composition according to claim 1, characterized in that as the fibrillated polyaramide fibers there are used poly-p-phenyleneterephthalamide fibrillated fibers in pulp form having a specific surface area according to BET method of 12 to 15 m²/g and an average length of 1.1 to 1.7 mm.

3. Composition according to claim 1, characterized in that as the combination of mineral fillers a combination of microsilica and precipitated amorphous silica is used.

4. Composition according to claim 1, characterized in that as biosoluble mineral fibers there are used rock wool fibers which are excluded from classification as a cancerogen according to the Note Q of the Directive of EU Commision 97/69E, for which fibers the short-term test of biopersistence by inhalation shows that fibers longer than 20 μm have a weighted half-life of less than 10 days.

5. Composition according to claim 1, characterized in that as the additional friction agent there are used corundum having an $Al_2O_3$ content above 95 wt. % or silicon carbide having a SiC content above 97.5 wt. %, and that with such a particle size distribution that at least 95 wt. % of particles are smaller than 6 μm.

6. Composition according to claim 1, characterized in that as the elastomeric binder nitrile butadiene rubber (NBR), carboxylated nitril butadiene rubber (XNBR), hydrogenated nitrile butadiene rubber (HNBR) or carboxylated hydrogenated nitrile butadiene rubber (XHNBR) are used.

7. A process for the preparation of a substance for applying onto a paper machine in the manufacture or a soft sealing material, characterized in that it comprises the following phases of treating components according to claim 1 in the stated sequence:
 a) defibration of polyaramide fibers in a defibrator to obtain an aqueous suspension with 3.5 to 4.5 wt. % of fibers, 50–60° SR, having a zeta potential of −10 to −15 mV;
 b) a hydromechanical treatment of an aqueous suspension of mineral fillers having a concentration of 45 to 55 wt. % mineral fillers with the addition of 0.1 to 0.15 wt. % of $Na_2CO_3$ for improving dispersibility up to zeta potential of −30 to −35 mV;
 c) feeding a suspension of polyaramide fibers and hydromechanically treated fillers into a mixing vessel, stirring and diluting;
 d) blending one part of the vulcanization paste into one part of the elastomeric binder for the first fixing, the amount of the elastomeric binder used and the proportional amount of the vulcanization paste being such that a ratio $R_1$ between the volume of the elastomeric binder and the total specific surface area of fibers and fillers amounts to from 4.5 to 5 nm;
 e) feeding d) into a mixing vessel;
 f) the first fixing of the elastomeric binder with the vulcanization paste onto the polyaramide fibers and mineral fillers by a precipitation agent until the sign of the zeta potential is changed;
 g) feeding and blending powder graphite and diluting;
 h) blending the second part of the vulcanization paste into the elastomeric binder for the second fixing, the amount of the elastomeric binder used and the proportional amount of vulcanization paste being such that a ratio $R_2$ between the volume of the elastomeric binder and the total specific surface area of all components amounts to from 7.5 to 8 nm;
 i) feeding h) into a mixing vessel;
 j) the second fixing of the elastomeric binder with the vulcanization paste onto the total amount of the components by a precipitation agent until the sign of the zeta potential is changed.

8. Soft sealing material, characterized in that it is produced according to the process of claim 7.

9. A product comprising a soft sealing material according to claim 1 for technical and industrial applications such as gaskets for flanges, valves, pumps, heat exchangers and pressure vessels, for use in the construction of power plants, chemical plants and heating systems, where it is necessary to provide for an optimum balance between the sealability of the sealing assembly and the thermal as well as chemical resistance of the sealing material employed.

10. A product comprising a soft sealing material according to claim 2 for technical and industrial applications such as gaskets for flanges, valves, pumps, heat exchangers and pressure vessels, for use in the construction of power plants, chemical plants and heating systems, where it is necessary to provide for an optimum balance between the sealability of the sealing assembly and the thermal as well as chemical resistance of the sealing material employed.

11. A product comprising a soft sealing material according to claim 3 for technical and industrial applications such as gaskets for flanges, valves, pumps, heat exchangers and pressure vessels, for use in the construction of power plants, chemical plants and heating systems, where it is necessary to provide, for an optimum balance between the sealability of the sealing assembly and the thermal as well as chemical resistance of the sealing material employed.

12. A product comprising a soft sealing material according to claim 4 for technical and industrial applications such as gaskets for flanges, valves, pumps, heat exchangers and pressure vessels, for use in the construction of power plants, chemical plants and heating systems, where it is necessary to provide for an optimum balance between the sealability of the sealing assembly and the thermal as well as chemical resistance of the sealing material employed.

13. A product comprising a soft sealing material according to claim 5 for technical and industrial applications such as gaskets for flanges, valves, pumps, heat exchangers and pressure vessels, for use in the construction of power plants, chemical plants and heating systems, where it is necessary to provide for an optimum balance between the sealability of the sealing assembly and the thermal as well as chemical resistance of the sealing material employed.

14. A product comprising a soft sealing material according to claim 6 for technical and industrial applications such as gaskets for flanges, valves, pumps, heat exchangers and pressure vessels, for use in the construction of power plants, chemical plants and heating systems, where it is necessary to provide for an optimum balance between the sealability of the sealing assembly and the thermal as well as chemical resistance of the sealing material employed.

15. A product comprising a soft sealing material according to claim 7 for technical and industrial applications such as gaskets for flanges, valves, pumps, heat exchangers and pressure vessels, for use in the construction of power plants, chemical plants and heating systems, where it is necessary to provide for an optimum balance between the sealability of the sealing assembly and the thermal as well as chemical resistance of the sealing material employed.

16. A product comprising a soft sealing material according to claim 8 for technical and industrial applications such as gaskets for flanges, valve, pumps, heat exchangers and pressure vessels, for use in the construction of power plants, chemical plants and heating systems, where it is necessary to provide for an optimum balance between the sealability of the sealing assembly and the thermal as well as chemical resistance of the sealing material employed.

* * * * *

UNITED STATES PATENT AND TRADEMARK OFFICE
CERTIFICATE OF CORRECTION

PATENT NO.         : 6,777,468 B2                                              Page 1 of 1
APPLICATION NO. : 10/276879
DATED              : August 17, 2004
INVENTOR(S)       : Franci Barboric et al.

It is certified that error appears in the above-identified patent and that said Letters Patent is hereby corrected as shown below:

In the Abstract
On line 21, please delete the term "fillers" and replace it with --fibers--

In the Specification
In column 2, line 16, please remove the term "fillers" hereby replacing it with the term --fibers--

In the Claims
In column 7, line 7, please remove the term "fillers", hereby replacing it with the term --fibers--

Signed and Sealed this

Twenty-ninth Day of May, 2007

JON W. DUDAS
*Director of the United States Patent and Trademark Office*